United States Patent

Gentner et al.

[11] Patent Number: 5,853,186
[45] Date of Patent: Dec. 29, 1998

[54] TRAILER COUPLING

[75] Inventors: Wolfgang Gentner, Ditzingen; Emmerich Kleb, Markgroeningen; Joerg Riehle, Stuttgart; Hans Riehle, Ludwigsburg, all of Germany

[73] Assignee: Oris Fahrzeugteile Hans Riehle GmbH, Moeglingen, Germany

[21] Appl. No.: 829,681

[22] Filed: Mar. 31, 1997

[30] Foreign Application Priority Data

Apr. 1, 1996 [DE] Germany .......................... 196 12 959.1

[51] Int. Cl.⁶ .................................................... B60D 1/54
[52] U.S. Cl. ................................ 280/491.3; 280/491.1; 280/511
[58] Field of Search ........................ 280/491.1, 491.3, 280/511, 495, 479.1, 478.1

[56] References Cited

U.S. PATENT DOCUMENTS

| | | |
|---|---|---|
| 2,408,531 | 10/1946 | Riemann et al. . |
| 2,604,331 | 7/1952 | Kingston .............................. 280/491.3 |
| 2,733,936 | 2/1956 | Tate . |
| 2,849,243 | 8/1958 | Halverson . |
| 2,889,155 | 6/1959 | Sandage .............................. 280/491.3 |
| 2,944,836 | 7/1960 | Matthews . |
| 3,640,550 | 2/1972 | Pearson . |
| 4,078,827 | 3/1978 | Pilhall ................................... 280/491.3 |
| 4,109,930 | 8/1978 | Pilhall ................................... 280/491.3 |
| 4,744,583 | 5/1988 | Blackwood . |

FOREIGN PATENT DOCUMENTS

| | | |
|---|---|---|
| 0 288 366 | 10/1988 | European Pat. Off. . |
| 26 19 913 | 11/1976 | Germany . |
| 28 35 920 | 2/1980 | Germany . |
| 33 28 524 | 2/1985 | Germany . |
| 295 20 254 | 4/1996 | Germany . |
| WO 91/15374 | 10/1991 | WIPO . |

*Primary Examiner*—Anne Marie Boehler
*Assistant Examiner*—Michael Cuff
*Attorney, Agent, or Firm*—Barry R. Lipsitz; Ralph F. Hoppin

[57] ABSTRACT

In order to improve a trailer coupling for motor vehicles, in particular, passenger vehicles, comprising a coupling ball, a ball neck, wherein the coupling neck can be pivoted with the coupling ball as a result of pivoting about a single pivot axis from an operative position into a rest position and vice versa, such that this no longer affects the ground clearance in its rest position it is suggested that a projection of a coupling ball central axis onto the vertical longitudinal plane undergo a rotation through an angle of at least 80° during pivoting of the ball neck about the pivot axis from the operative position into the rest position and that a lowest point of ball neck and coupling ball in the rest position be at least at the level of a lowest point of the ball neck in the operative position.

52 Claims, 8 Drawing Sheets

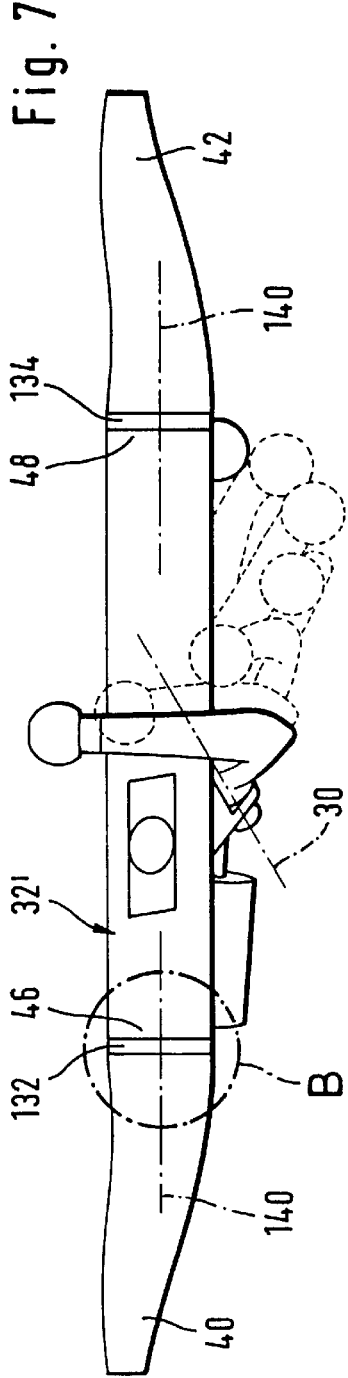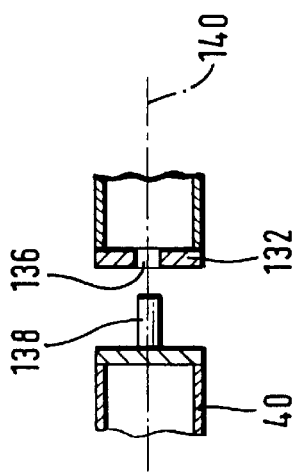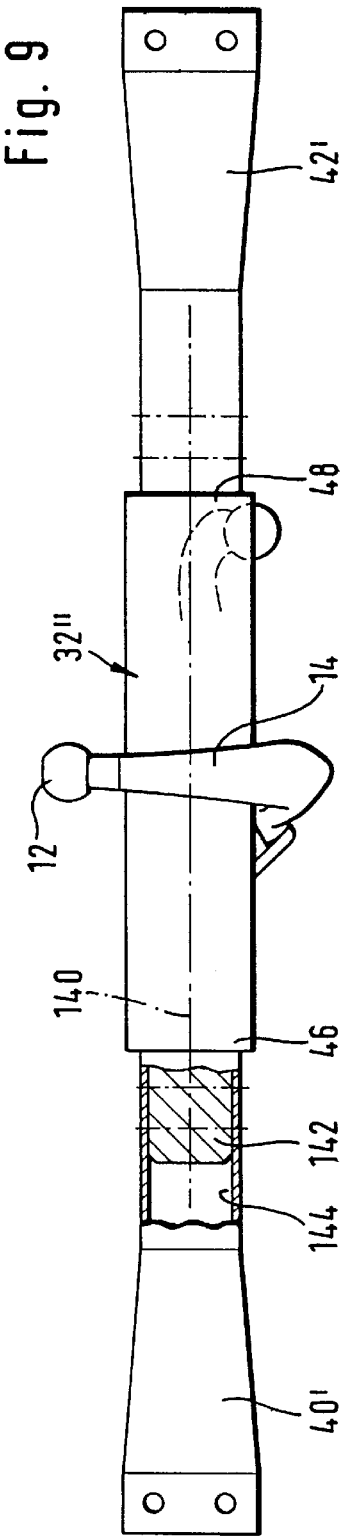

TRAILER COUPLING

BACKGROUND OF THE INVENTION

The invention relates to a trailer coupling for motor vehicles, in particular passenger vehicles, comprising a coupling ball, a ball neck, one end region of which is angled and bears the coupling ball and the other end region of which is connected to a bearing element, a pivot bearing stationary with respect to the vehicle and pivotally mounting the bearing element, the single pivot axis of this pivot bearing being aligned at an angle to a vertical longitudinal plane parallel to the longitudinal direction of the vehicle, wherein the coupling neck is pivotable with the coupling ball as a result of pivoting about the pivot axis from an operative position, in which the ball neck extends essentially along the longitudinal plane, into a rest position, in which the ball neck extends approximately transversely to the longitudinal plane, and vice versa.

A trailer coupling of this type is known from DE-C-26 19 913.

The trailer coupling described in this publication does, however, have the disadvantage that, in relation to the fender, it projects downwards even further in the rest position in comparison with the operative position and thus negatively affects the ground clearance of the motor vehicle.

The object underlying the invention is therefore to improve a trailer coupling of the generic type such that this no longer affects the ground clearance in its rest position.

SUMMARY OF THE INVENTION

This object is accomplished in accordance with the invention, in a trailer coupling of the type described at the outset, in that a projection of a coupling ball central axis onto the vertical longitudinal plane undergoes a rotation through an angle of at least 80° during pivoting of the ball neck about the pivot axis from the operative position into the rest position and that a lowest point of ball neck and coupling ball in the rest position is at least at the level of a lowest point of the ball neck in the operative position.

In the case of such a rotation of the projection of the coupling ball central axis onto the longitudinal plane, a corresponding rotation of the ball neck takes place at the same time and so the ball neck is inclined as a result of the pivoting movement about the pivot axis to such an extent that it is located in the rest position with its lowest point at least at exactly the same level above the road surface as in operative position and thus the unit consisting of ball neck and coupling ball does not affect the ground clearance in the rest position.

It is particularly advantageous when the projection of the coupling ball central axis onto the vertical longitudinal plane undergoes a rotation of more than 90°, even better of more than 100° and most preferably of more than 120°, during pivoting about the pivot axis. Particularly during a pivoting of the coupling ball central axis through more than 90°, preferably more than 120°, the rest position space required by ball neck and coupling ball in the rest position can be designed to be particularly small in the vehicle direction.

The rotation of the projection of the coupling central axis onto the longitudinal plane amounts to 210° at the most, even better 180° at the most, preferably 160° at the most.

The projection of the coupling ball central axis onto the vertical longitudinal plane preferably forms with the horizontal an angle in the range of approximately 30° to approximately 150°, even better in the range of approximately 40° to approximately 140°, so that a rest position space is obtained which is designed to be small in the longitudinal direction of the vehicle.

It is possible with the inventive teaching to move the unit consisting of ball neck and coupling ball beneath the fender of the motor vehicle into a rest position which is covered from sight by the fender and thus located above a 15° line of sight and also does not affect the ground clearance negatively.

A particularly advantageous solution of the inventive object can be achieved when the projection of the coupling ball central axis onto the vertical longitudinal plane in the rest position extends at an angle of at least 170° in relation to a horizontal line. It is even better when the projection of the coupling ball central axis onto a vertical longitudinal plane in the rest position extends at an angle of more than 180°, even better of more than 210°, in relation to a horizontal line.

This ensures that the unit consisting of ball neck and coupling ball is turned in the rest position to such an extent that it can be moved out of the visible region in a simple manner and positioned in a space-saving manner.

An additional, advantageous solution to the inventive object may be achieved when the coupling ball in the rest position is arranged at a distance from a road surface which is equal to or smaller than a distance of the angled end region from the road surface and when a lowest point of ball neck or coupling ball in the rest position is located at least at the level of a lowest point of the ball neck in operative position. This definition also determines a condition which enables the unit consisting of ball neck and coupling ball to be positioned above the road surface with favorable space requirements and sufficient height.

The ball neck can be positioned with the coupling ball in a particularly space-saving manner when, in the rest position, the plane of curvature of the ball neck forms with a horizontal plane an angle in the range of approximately 30° to approximately 150°, even better approximately 40° to approximately 140°.

It may be ensured in a particularly simple manner that ball neck and coupling ball are removed in the rest position sufficiently far out of the line of sight when the ball neck and the coupling ball in the rest position are located on a side remote from the road surface of a horizontal plane defined by a lower edge of the pivot bearing.

A particularly advantageous realization of the inventive solution provides for the projection of the pivot axis onto a vertical longitudinal plane parallel to the longitudinal direction of the vehicle to be inclined in relation to the horizontal through an angle which is in an angular range of approximately 0° to approximately 60°.

Ball neck and coupling ball can be positioned in the rest position even better when the angular range is up to 50° at the most.

The ground clearance during pivoting may be improved when the angular range begins at at least 15°, even better at at least 30°.

In addition, it is expedient in the case of an inventive solution when the projection of the pivot axis onto a horizontal plane extends through an angle inclined in relation to the longitudinal direction of the vehicle which is in an angular range of approximately 20° to approximately 70°.

It is particularly advantageous when the angular range is between approximately 30° and approximately 65°, even better between approximately 40° and approximately 60°.

It is advantageously provided for the projection of the pivot axis onto a vertical transverse plane extending at right angles to the longitudinal direction of the vehicle to be inclined in relation to the horizontal through an angle which is in an angular range of approximately 0° to approximately 60°.

The inventive object may be accomplished in an advantageous manner, in a further embodiment, in that the angled end region of the ball neck in the rest position is located on a side remote from the road surface of a horizontal plane extending at the level of a lowest point of the coupling ball located in rest position and that the horizontal plane is located at least at the level of the lowest point of the ball neck located in operative position. It is ensured with this definition of the rest position that the coupling ball defines the lowest point of the unit consisting of ball neck and coupling ball and the ball neck extends with the angled end at the most as far as this point but is preferably located at a higher level for reasons of a space-saving arrangement.

It is even more advantageous when the entire ball neck is located, in particular, with the bearing element in the rest position on a side remote from the road surface of a horizontal plane extending at the level of the lowest point of the coupling ball located in rest position so that the entire ball neck extends at the most as far as this plane, preferably on the side of this plane remote from the road surface.

The ball neck may be positioned with the coupling ball in a particularly space-saving manner when in the rest position the plane of curvature of the ball neck forms with a horizontal plane an angle in the range of approximately 30° to approximately 150°, even better approximately 40° to approximately 104°.

A further definition of the inventive solution provides for the coupling ball to have an upper calotte surface located opposite the angled end of the ball neck, this surface facing way from the road surface in the operative position and facing this at least in an inclined manner in the rest position.

An inventive solution is particularly favorable when the pivot bearing is arranged in relation to the plane of curvature to be offset unsymmetrically in the direction of a side opposite the rest position of a plane of curvature of the ball neck.

This offset can, for example, be so slight that the pivot bearing is merely located unsymmetrically to the plane of curvature of the ball neck but is still intersected by the plane of curvature.

Its offset can, however, also be so great that the pivot bearing or at least the pivot member are located laterally next to the plane of curvature of the ball neck.

In conjunction with the preceding explanations of the individual embodiments, no details have been given as to how the pivoting movement is intended to be brought about. For example, it is possible within the scope of the inventive solution to carry out the pivoting movement as a result of direct action on the ball neck by hand or by means of a drive actuated by hand, for example, with a crank handle.

However, the inventive solution can be operated in a particularly comfortable manner when an electric drive having a motor, preferably having an electromotor, is provided for carrying out the pivoting movement about the pivot axis so that a motor-driven pivoting of ball neck and coupling ball between the operative position and the rest position can be carried out with the motor.

With respect to the action of the drive on the bearing element for carrying out the pivoting movement, all possible solutions for an intermediate gearing are conceivable. It is, however, particularly advantageous when the drive acts on the bearing element via a self-locking gearing since, in this case, the self-locking gearing can already be used to fix the ball neck with the coupling ball in the rest position and/or in the operative position. Moreover, no forces acting on the coupling ball retroact as torque on the motor of the drive and so the motor need merely be designed such that it is in a position to pivot coupling ball and ball neck between the operative position and the rest position without any force acting on them.

In order to clearly define the operative position and/or the rest position, it is preferably provided for the pivoting movement of the ball neck to be limited by a stop stationary with respect to the vehicle. This is preferably a stop which acts on the bearing element.

In the simplest case, it is provided in such a solution for the bearing element to have a projection which acts on the stop stationary with respect to the vehicle at least in the rest position or the stop position.

In this case, the operative position is preferably determined by the projection acting against a stop stationary with respect to the vehicle while the rest position of the ball neck can, for example, also be determined by the ball neck itself coming to rest on a stop surface stationary with respect to the vehicle with any region of it in the rest position.

As already explained in the above, it is possible by means of a self-locking gearing for the ball neck with the coupling ball to remain in the operative position, even when the customary traction and braking forces act on the coupling ball, for example, as a result of a trailer.

In order, however, to offer a maximum in safety, it is provided in addition or alternatively to a self-locking gearing for the ball neck to be fixable in the operative position by means of a locking device. As a result of such a locking device, it is possible to fix the ball neck in the operative position in a reliable manner in the same way as with the couplings previously known, which can be removed and attached manually.

The locking device is preferably designed such that it transfers automatically into a locking position when the operative position of the ball neck is reached and thus fixes the ball neck in the operative position. This ensures that—particularly when the inventive solution is operated by means of an electric drive—the ball neck is locked automatically in the operative position when reaching this operative position.

With a locking device of this type, it is expediently provided for this to have an actuatable release device for releasing the locking position.

The release device can be actuated in the most varied of ways. In the simplest case, it would be conceivable to provide a manual release device.

It is, however, particularly advantageous, especially in conjunction with a drive having a motor, when the release device can be actuated by means of a release drive. Such a release drive could, for example, be an activatable electromagnet actuating the release device.

A particularly expedient solution, particularly with respect to the simplicity and inexpensiveness of the construction, provides for the release device to be actuatable by the drive for pivoting the ball neck, i.e. the drive motor, with which the ball neck can be pivoted, is used, for example, at the same time to actuate the release device.

With respect to the fixing of the pivot bearing in position on the vehicle, the most varied of solutions are conceivable.

For example, it would be conceivable to fix the pivot bearing in position on the fender unit of the motor vehicle.

A solution which can be installed particularly advantageously provides for the pivot bearing to be held on a transverse support member extending transversely to the longitudinal direction of the vehicle approximately in the same orientation as the rear fender. A transverse support member of this type creates the possibility of creating a fixing in position independent of the fender unit when equipping the vehicles.

It is particularly advantageous when the transverse support member is arranged between two side supports forming additional parts and connected to them and when the side supports extend to supporting points on the side of the vehicle. Three structural units are thus provided for fixing the pivot bearing in position on the vehicle, wherein the transverse support member and the side supports can be preassembled so that the entire unit consisting of transverse support member and side supports can be mounted on supporting points on the side of the vehicle.

The subdivision of the fixing of the pivot bearing into a transverse support member and two lateral side supports allows an adaptation to the most varied of vehicle types to be carried out in a simple manner and such that the transverse support member which supports the pivot bearing always represents the same unit in the case of different types of vehicle while the adaptation to the different types of vehicle can be realized via the side supports which then have to be adapted to the supporting points available in the different types of vehicle.

A particularly favorable adaptation to the most varied of vehicle types is possible when the transverse support member can be attached to the side supports via a connection adapted to be fixed in various rotary positions in relation to a transverse axis extending transversely to the longitudinal direction of the vehicle. On the one hand, this allows a rigid connection to be provided between the transverse support member and the side supports during the production thereof and, on the other hand, an additional degree of freedom to be available in the adaptation of the unit consisting of transverse support member and side supports to individual types of vehicle, namely in that the transverse support member can be mounted in different rotary positions relative to the side supports.

It is particularly expedient when the connection between the transverse support member and the side supports has two connecting elements which engage in one another and can be rotated in opposite directions to one another only about the transverse axis. This means that a positive connection suitable, in particular, for large forces is created which has only the one degree of freedom, namely the possibility of a rotational fixing of the transverse support member relative to the side supports.

A connection which is particularly preferred on account of its simplicity and stability provides for this to have connecting elements insertable into one another in the direction of the transverse axis, forming a slip connection.

These connection elements thus allow a positive connection with only one possible degree of freedom with respect to the rotation on account of the slip connection, wherein the rotary position between the transverse support member and the side supports is then determined in the various rotary positions.

The connecting elements are thereby preferably designed such that they transfer the forces acting transversely to the transverse axis through the positive slip connection.

With respect to the position of the ball neck and the coupling ball in the rest position relative to the transverse support member, no further details have so far been given. In principle, the relative position of ball neck and transverse support member to one another is without any great relevance for the inventive solution since the transverse support member can have any optional shape.

A particularly favorable solution, especially with respect to the necessary structural space, does, however, provide for the ball neck in the rest position to extend at least in sections along the transverse support member.

It is particularly favorable with respect to the structural space when the ball neck in the rest position extends at an approximately constant distance from a side of the transverse support member facing it.

A particularly suitable position provides for the ball neck with the coupling ball to be located in the rest position such that a connecting line between bearing element and coupling ball extends approximately along the transverse support member in the transverse direction of the vehicle.

In order not to be subject to any limitations when designing the side supports, with respect to the shape of them, it is advantageously provided for the ball neck and the coupling ball to be located in the rest position between the ends of the transverse support member.

In conjunction with the preceding explanations concerning the individual embodiments, it has merely been assumed that the pivot bearing is held on the transverse support member. It is, however, also particularly advantageous when the drive for the pivoting of the ball neck is held on the transverse support member since the transverse support member thus forms in a simple manner a base for the two interacting parts.

In addition, it is advantageously provided for the stops for limiting the pivoting movement of the ball neck in the operative position and the rest position to be held on the transverse support member so that these are also arranged on the same base as the pivot bearing and, where applicable, the drive.

When a locking device is also provided for the ball neck located in the operative position, it is advantageously provided for the locking device to be arranged on the transverse support member.

With respect to the relative arrangement of drive and rest position of the ball neck with coupling ball on the transverse support member, no further details have been given in conjunction with the preceding explanations concerning the individual embodiments. An advantageous embodiment thus provides for the drive for the pivoting movement to be arranged on a side of the pivot bearing located opposite the rest position of ball neck and coupling ball so that an extremely compact construction of the inventive trailer coupling results which requires as small a structural space behind the fender as possible when installed in a vehicle.

One embodiment which is particularly advantageous with respect to its assembly provides for the transverse support member to be a shaped part, on which the pivot bearing is integrally formed.

In addition, an advantageous embodiment provides for the transverse support member to be a shaped part and to have a receiving means for the drive so that it is not necessary to provide additional holding elements for the connection of transverse support member and drive.

In addition, it is advantageously provided for the transverse support to be a shaped part which has a receiving means for the self-locking gearing so that the self-locking gearing which, where applicable, has to absorb considerable forces can be mounted on the transverse support member with adequate stability and as simply as possible.

It is particularly advantageous when the transverse support member is a shaped part, on which a stop is integrally formed which must likewise be designed to absorb considerable forces and thus is already realized particularly favorably by the shaped part.

In addition, it is advantageous when the transverse support member is a shaped part which has a receiving means for the locking device.

The transverse support member can be produced as a shaped part in different ways. It is, for example, conceivable to use as transverse support member a welded, bent or forged steel part.

Alternatively thereto, it is advantageously possible to use a casting as shaped part, wherein this shaped part can be a steel casting or a light metal casting, in particular, an aluminum casting.

When using a drive having a motor for the pivoting of ball neck and coupling ball between the operative position and the rest position, a control means for operating the motor is preferably provided, wherein this control means is expediently designed such that this allows either a pivoting of the ball neck or traveling of the vehicle.

Such a design of the control means has the great advantage that this ensures optimum safety for the case where a pivoting of the ball neck during travel can occur either on account of erroneous actuations or other error functions.

This may be realized, for example, when the control means blocks the drive for the pivoting of the ball neck when the engine of the vehicle is running. In this case, the pivoting of the ball neck can take place only when the engine of the vehicle is switched off. It is thus ensured that during travel no pivoting of the ball neck can take place by means of the drive provided with a motor.

Such a blocking of the drive by the control means can preferably be realized by the control means interrupting a supply of current for the drive.

Alternatively or in addition hereto, a further improvement in operational safety can be achieved when the control means allows the engine of the vehicle to run only when the ball neck is in the operative position or in the rest position so that it is again ensured that any operation of the vehicle is only possible when the ball neck is in one of two defined positions, namely the operative position or the rest position. Thus, all error operations of the type that travel with the vehicle takes place with a ball neck located in any intermediate position between the operative position and the rest position are excluded.

In principle, it would be possible to detect the operative position or the rest position of the ball neck via an interrogation, for example an interrogation of the revolutions of the drive. For safety reasons it is, however, particularly expedient when the control means detects the operative position and the rest position of the ball neck via a sensor respectively associated with these positions so that a direct feedback to the control means independent of the drive takes place via this sensor.

The operative position of the ball neck can be interrogated in the most varied of ways. For example, it is possible to interrogate the operative position by means of the sensor in that the ball neck or the bearing element are in a position corresponding to the operative position. Increased safety is given when the control means detects the operative position of the ball neck via a sensor detecting the locking position of the locking device. This means that the operative position is detected only when the locking device is in the locking position at the same time and it is thus also ensured that the ball neck is not only located in the operative position but at the same time also secured by the locking device.

A particularly reliable detection of the operative position of this type can, for example, be realized when not only the operative position of the ball neck as such but also the locking position of the locking device are detected either via a mechanical AND operation and a sensor or via two sensors detecting these respectively.

In order to bring about a particularly simple and reliable operation of the pivoting, in particular of the drive for the pivoting, and, in particular, to preclude the ball neck remaining in any intermediate position between the operative position and the rest position due to any error in operation, it is preferably provided for the control means to supply the motor with current following a single actuation of a switching element for such a time until the ball neck has reached either the operative position or the rest position.

In order to create the possibility, in addition, of an operator, when, for example, an obstruction appears in the pivoting path of ball neck and coupling ball or is discovered only after the switching element has been actuated and thus the pivoting movement initiated, an emergency switch is provided.

In principle, it would be possible to design the control means as an additional safety element such that when the switching element is actuated during the course of a pivoting movement of the ball neck this is interrupted.

It is, however, particularly advantageous when, following an actuation of the switching element during the course of the pivoting movement of the ball neck between the operative position and the rest position, the control means reverses the pivoting direction existing up to this actuation. The possibility is thus created that ball neck and coupling ball will not continue to move once an obstruction in the pivoting region has been discovered but will not only interrupt the pivoting movement but reverse it, wherein it is assumed in this respect that the ball neck and the coupling ball are moved back, following reversal of the pivoting movement, in the direction, from which they come, wherein an obstruction can scarcely exist in this direction.

A further safety function is obtained when the control means comprises a torque detection for the drive which detects any overrunning of a torque threshold of the drive. It is thus ensured that even when the ball neck or the coupling ball unexpectedly run against an obstruction no damage can occur either to the obstruction or to the inventive coupling.

The torque detection could serve to supply a signal to the control means which causes the control means to interrupt the pivoting movement of the ball neck.

It is, however, even more advantageous when the torque detection generates a signal when the torque threshold is exceeded so that the control means reverses the previous pivoting direction. This ensures on the one hand, in the same way as already explained for the actuation of the switching means, that ball neck or coupling ball do not run against an obstruction and continue to act repeatedly against this but interrupt their pivoting movement and even reverse it and thus pivot back, for example, into the position, from which they come.

In the simplest case, it is, for example, provided for the torque threshold to be the same in all stages of the pivoting movement.

However, in order to have—particularly in the case of a long holding time of ball neck and coupling ball in the operating position or the rest position—as large an initial break-away torque as possible for leaving these positions, it is preferably provided for the torque threshold in the operating position and the rest position to be higher prior to leaving the same than thereafter. The initial break-away torque for leaving the operating position or rest position is thus increased which does not, however, represent any loss of safety as long as the torque threshold is lowered again after the operating position or rest position is left.

The torque detection can operate in the most varied of ways. A simple solution for this provides for the torque detection to detect the current consumption of the motor.

With respect to the arrangement of the switching element of the control means, no further details have been given in conjunction with the preceding explanations of the individual embodiments. One particularly advantageous solution provides, for example, for the switching element and the control means to be arranged in the trunk of the motor vehicle. Such an arrangement offers the advantage of a relatively simple accommodation of the control means, in particular close to the remaining coupling components, and, moreover, the advantage that the switching element can likewise be attached to the control means and the control means can be actuated from the trunk.

Furthermore, a particularly advantageous embodiment of an inventive trailer coupling provides for the coupling to comprise only one electrical functional group, comprising the control means, and only one mechanical functional group connected with this and comprising the transverse support member with the drive mounted thereon, the pivot bearing as well as the ball neck with coupling ball mounted thereon.

Therefore, when assembling the coupling only the electrical functional group and the mechanical functional group have to be mounted, the latter together with the side supports, and so an extremely simple and cost-saving assembly of the inventive coupling is possible.

Additional features and advantages of the invention are the subject matter of the following description as well as the drawings illustrating several embodiments.

BRIEF DESCRIPTION OF THE DRAWINGS

FIG. 7 shows a view similar to FIG. 1 of the variation illustrated in FIG. 6;

FIG. 8 shows a sectional exploded illustration of a connection between transverse support member and side supports in the region B in FIG. 7;

FIG. 9 shows a variation of the embodiment illustrated in FIGS. 6 and 7;

DETAILED DESCRIPTION OF THE DRAWINGS

Figure 1:
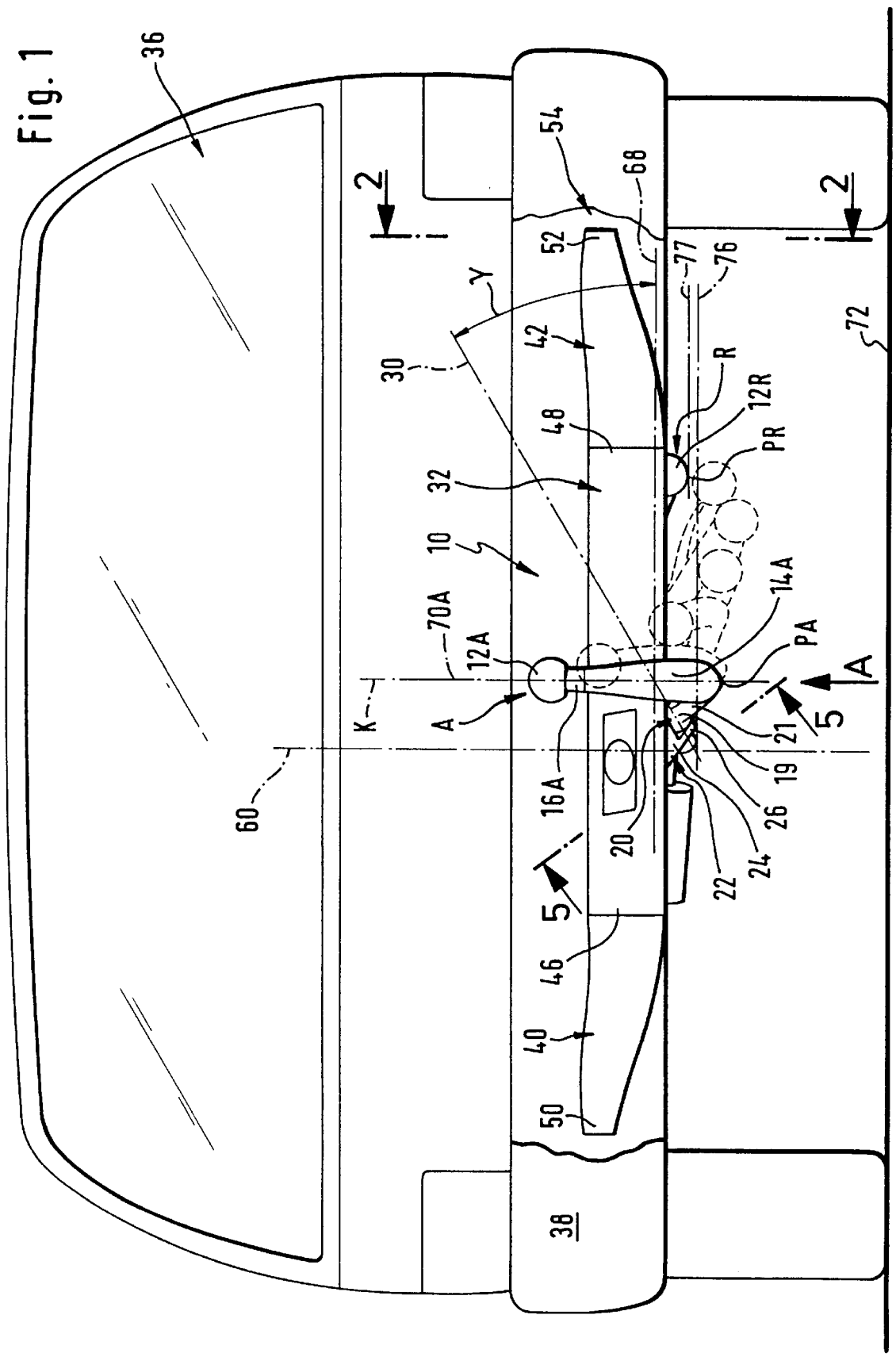
FIG. 1 shows a plan view of a vehicle with an inventive trailer coupling from behind with a fender unit partially broken away, wherein the plane of projection represents a vertical transverse plane extending at right angles to the longitudinal direction of the vehicle.
Figure 2:
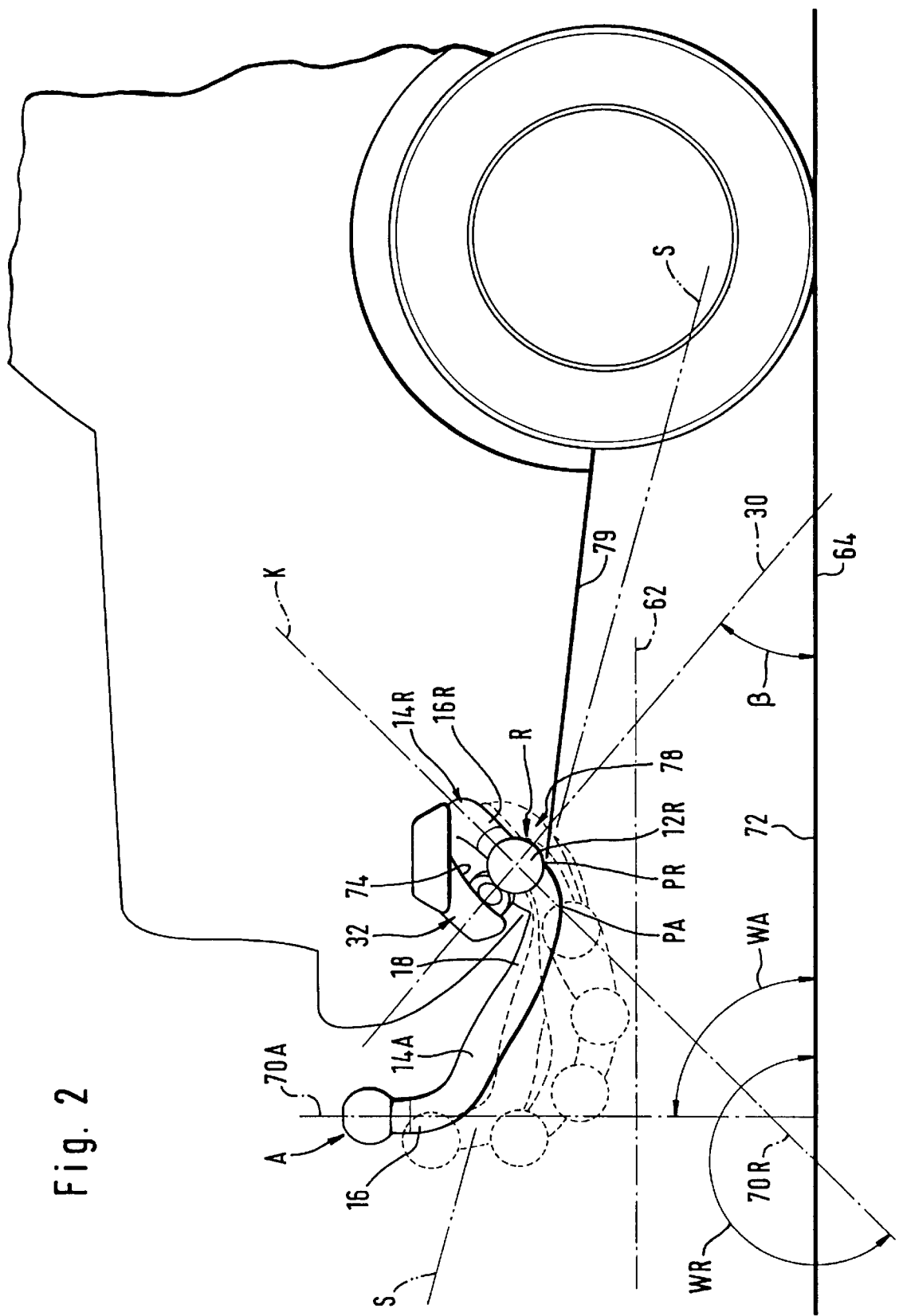
FIG. 2 shows a section through a rear part of the vehicle in the region of the inventive coupling along line 2—2 in FIG. 1, wherein the plane of projection is a vertical longitudinal plane extending parallel to the longitudinal direction of the vehicle.
Figure 3:
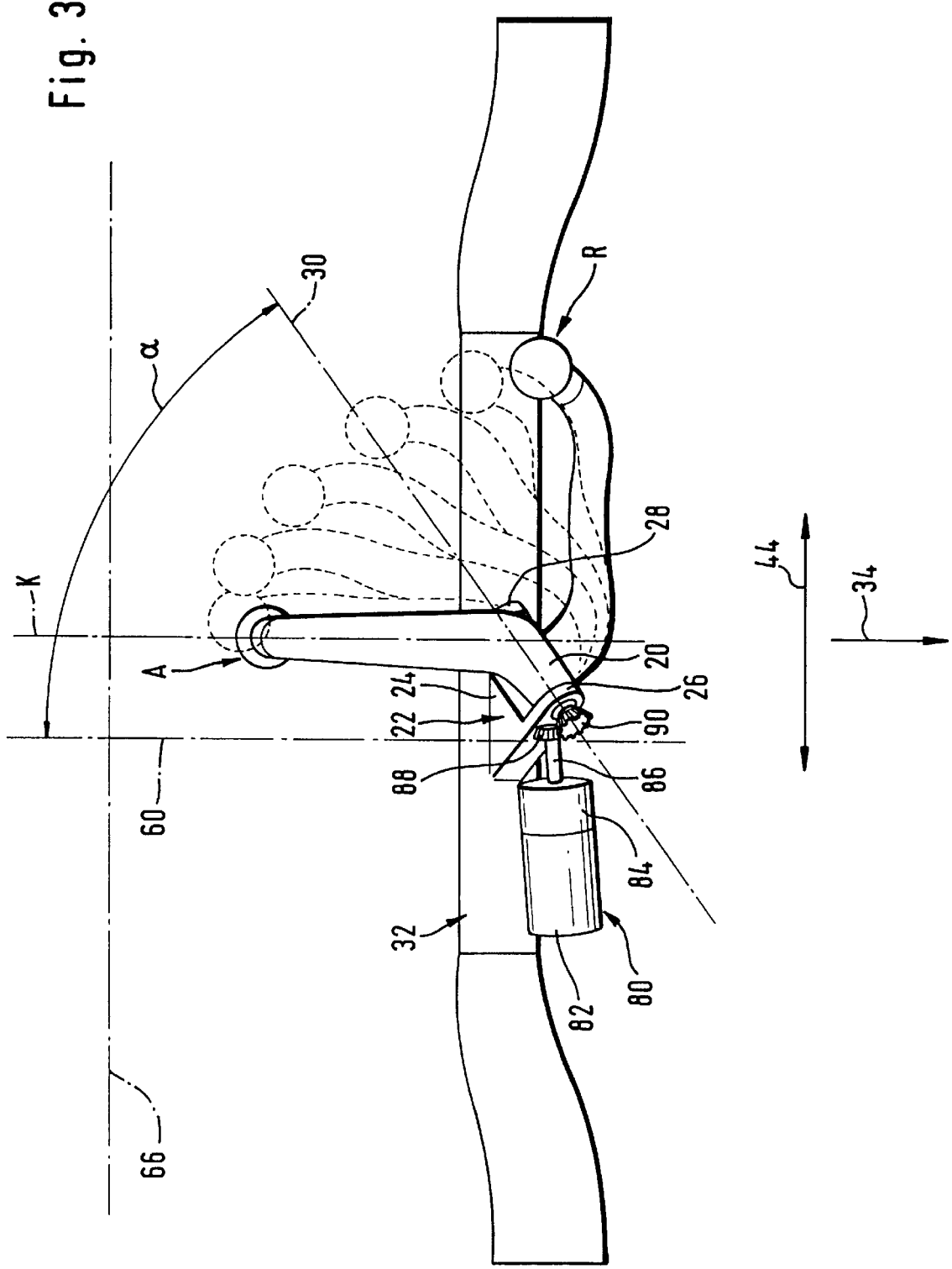
FIG. 3 shows a plan view of the inventive coupling in the direction of arrow A in FIG. 1, wherein the plane of projection is a horizontal plane.

One embodiment of an inventive trailer coupling which is illustrated in FIGS. 1 to 3 and designated as a whole as 10 comprises a coupling ball 12 which is supported by a ball neck 14, wherein the ball neck 14 has an angled end region 16, on which the coupling ball 12 is directly seated, and a lower end region 18 which is located opposite this angled end region 16 and connected to a bearing element 20, wherein this bearing element 20 can be pivoted about a pivot axis 30 in a pivot bearing 22, for example comprising a bearing member 24 with two bearing flanges 26 and 28.

The bearing element 20 preferably comprises a pivoting member 19 located in the pivot bearing 22, for example, between the bearing flanges 26 and 28 and an arm 21 extending from the pivoting member 19 to the end region 18 of the ball neck 14, wherein the arm extends at an angle to the plane of curvature K of the ball neck 14 in an operative position A of the ball neck 14A, namely in a direction opposite to a rest position R of the ball neck, so that the pivot bearing 22 and the pivoting member 19 are essentially located to the side of the plane of curvature K.

The pivot bearing 22 is, for its part, held on a transverse support member which is designated as a whole as 32 and extends transversely to a longitudinal direction 34 of a motor vehicle designated as a whole as 36 and along a rear fender unit 38 thereof.

The transverse support member 32 is preferably seated between two side supports 40 and 42 which adjoin ends 46 and 48 of the transverse support member 32, which are located opposite one another in a transverse direction 44 of the vehicle extending at right angles to the longitudinal direction 34 of the vehicle, and extend as far as lateral attachment regions 50, 52 on a vehicle body 54.

The inventive trailer coupling is connected to the vehicle body 54 in the attachment regions 50 and 52.

The pivot axis 30 extends at an angle to a vertical longitudinal plane 60 extending parallel to the longitudinal direction 34 of the vehicle, wherein the projection of the pivot axis 30 onto a horizontal plane 62 forms with the longitudinal plane 60 or the longitudinal direction 34 of the vehicle an angle α which is, for example, in an angular range of approximately 50° to approximately 60°, preferably amounts to approximately 55° (FIG. 3).

In addition, the projection of the pivot axis 30 onto the longitudinal plane 60—as illustrated in FIG. 2—forms with a horizontal line 64 extending in the longitudinal plane 60 an angle β which is, for example, in an angular range of approximately 35° to approximately 45°, preferably amounts to approximately 40°.

Furthermore, the projection of the pivot axis 30 onto a vertical transverse plane 66 parallel to the transverse direction 44 of the vehicle and at right angles to the longitudinal plane 60—as illustrated in FIG. 1—forms with a horizontal line 68 extending in this plane an angle γ which is, for example, in an angular range of approximately 25° to approximately 35°, preferably amounts to approximately 30°.

The ball neck 14 is pivotable about the pivot axis 30 from an operative position A, in which a coupling ball central axis 70 extends approximately at right angles onto the horizontal plane 62 and the ball neck 14, as illustrated in FIGS. 1 and 3, extends in a plane of curvature K extending to the longitudinal plane 60 and through the coupling ball central axis 70 in a curved manner as far as the bearing element 20, into the rest position R.

In the rest position R, the coupling ball central axis 70R extends at an angle to the horizontal plane 62, wherein, proceeding from the coupling ball 12R located in rest position, the angled end region 16R of the ball neck 14R adjoining this coupling ball extends from a side of the coupling ball 12R facing away from a road surface 72.

This means, in other words, that the coupling ball 12A in the operative position A points upwards away from the road surface 12 and the ball neck 14 extends downwards in the direction of the road surface 72 proceeding from the coupling ball 12A while, in the rest position R, the coupling ball 12R points towards the road surface 72 while the ball neck 14R extends upwards proceeding from the coupling ball 12R, i.e. away from the road surface 72 in an arc as far as the pivot bearing 22.

In the rest position R, in particular, the ball neck 14R extends along the transverse support member 32, preferably as close as possible to an underside 74 thereof facing the road surface 72 in order to obtain as small a rest position space 78 as possible for accommodating the ball neck 14R of the coupling ball 12R in the rest position R.

Furthermore, in the rest position R the ball neck 14R with the coupling ball 12R is arranged essentially above a line of sight S, which is tangent to the underbody structure of the vehicle body or the fender unit 38, extends in the longitudinal plane 60 and is inclined 15° in relation to the road surface 72, in order to position the ball neck 14R with the coupling ball 12R to be essentially invisible for a bystander.

To illustrate the pivoting movement of the ball neck 14 with the coupling ball 12 from the operative position A into the rest position R, the operative position A and the rest position R thereof are shown in FIGS. 1 to 3 by solid lines whereas intermediate positions between the two are indicated by dashed lines.

In this respect, it is apparent that on account of the inclined position of the pivot axis 30 the ball neck 14 extending first of all in the operative position A parallel to the longitudinal plane 60 with its plane of curvature K transfers into a position, in which its plane of curvature K extends at an angle and/or transversely to the longitudinal plane 60.

The movement of the ball neck 14 with the coupling ball 12 and, in particular, the pivoting thereof may—as illustrated in FIG. 2—be described particularly simply by the illustration of the projection of the coupling ball central axis 70 onto the vertical longitudinal plane 60 or a plane parallel thereto. In the operative position A, the projection of the coupling ball central axis 70A onto the longitudinal plane 60 forms an angle WA with the horizontal line 64 of approximately 90°. The coupling ball central axis 70 is pivoted during the pivoting of the ball neck 14 with the coupling ball 12 from the operative position A into the rest position R to such an extent that the projection of the coupling ball central axis 70 in the longitudinal plane 60 undergoes a rotation, namely to such an extent that the projection of the coupling ball central axis 70R in rest position in the longitudinal plane 60 forms with the horizontal line 64 an angle WR which is greater than 180°. The angle is preferably more than 225°.

In order to make, in particular, the ball neck 14R and the coupling ball 12R in the rest position R as invisible as possible for an observer of the motor vehicle 36, the coupling ball 12R is located in the rest position R on a side of a horizontal plane 76 facing away from the road surface 72, the height of which above the road surface 72 is defined by a lower edge of the pivot bearing 22, or touches this horizontal plane 76 so that a lowest point PR of the ball neck 14R and coupling ball 12R in rest position—in this case the lowest point PR of the coupling ball 12R in a horizontal plane 77—is higher than the horizontal plane 76 (FIG. 1) and higher than a lowest point PA of the ball neck 12A in operative position A.

The ball neck 14R and the coupling ball 12R are preferably located in the rest position R in a rest position space 78 which is located between the rear fender unit 38 and the vehicle body 54 and extends along the fender unit 38 in the transverse direction 44 of the vehicle.

The rest position space 78 is expediently located above a surface 79 of the vehicle 36 on the road side defined by an underbody structure of the vehicle body 54 and the fender unit 38 (FIG. 2).

For driving the pivoting movement of the ball neck 14 with the coupling ball 12 about the pivot axis 30, a drive is provided which is designated as a whole as 80 and comprises an electric motor 82 as well as, for example, a self-locking or self-blocking gearing 84. A bevel gear 88 is seated on a driven shaft 86 of the gearing 84 and drives a bevel gear 90 which is non-rotatably connected to the bearing element 20 and preferably seated on a side of the bearing element 20 facing the road surface 72.

The self-locking gearing 84 is designed such that it is blocked in relation to external torques acting on the driven shaft 86 and can be driven only via the motor 82. For example, the self-locking gearing 84 is designed as a worm gear.

Figure 4:
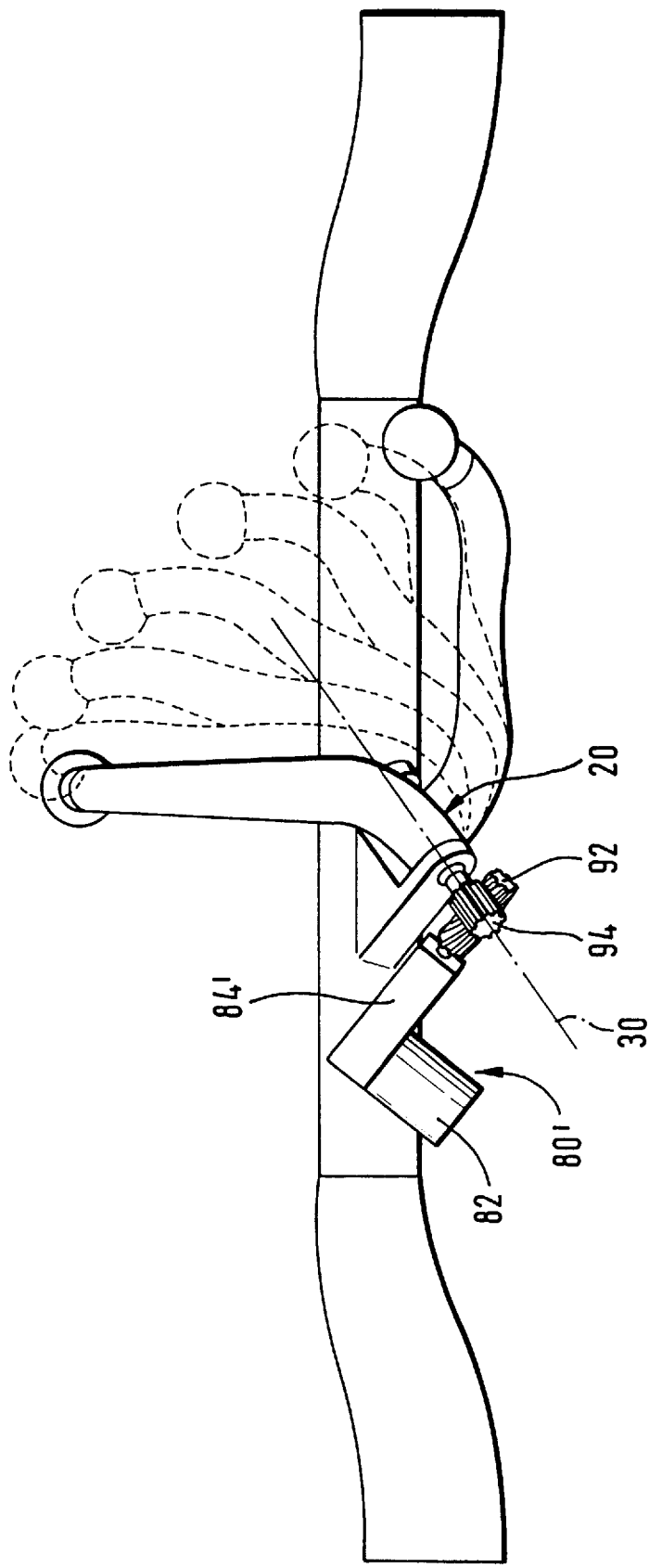
FIG. 4 shows a plan view similar to FIG. 3 of a variation of the inventive solution.

In a variation of the first embodiment, illustrated in FIG. 4, the drive 80' likewise comprises the electromotor 82 and a gearing 84' which is connected with this and need not necessarily be designed as a self-locking gearing but represents, for example, a miter gear. The gearing 84' drives, for its part, a worm wheel 92 which is seated on its driven shaft and drives, for its part, a gear wheel 94 non-rotatably connected to the bearing element 20 and engaging with the worm wheel 92, which together form a self-locking gearing.

The drive 80 is preferably arranged on a side of the pivot bearing 22 located opposite the rest position R of the ball neck 14R and is fixed on the transverse support member 32.

Figure 5:
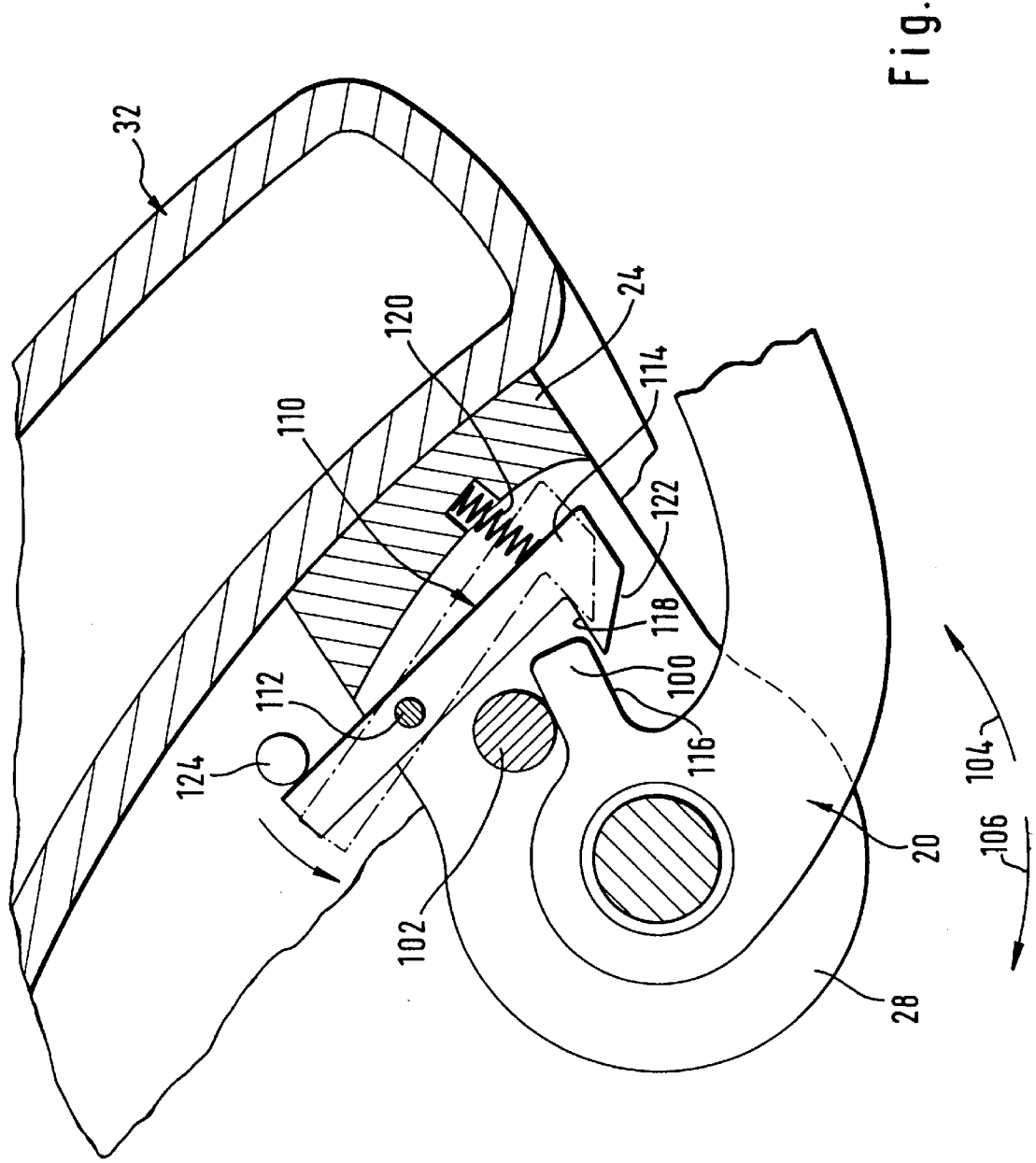
FIG. 5 shows a section along line 5—5 in FIG. 1.

In order to determine the operative position A exactly, the bearing element 20 is, for example, as illustrated in FIG. 5, provided with a nose-like projection 100 which abuts in the operative position on a stop 102 rigidly connected to the transverse support member 32, wherein the stop 102 is, for example, designed as a pin extending between the bearing flanges 26 and 28.

During a pivoting movement in the direction 104 into the operative position A, the projection 100 comes to rest on the stop 102.

If, in the inventive solution, the drive takes place via the self-locking gearing 84 or the worm wheel 92 with the gear wheel 94 which likewise acts as a self-locking gear, it would, in principle, not be necessary to provide an additional safety means during abutment of the projection 100 on the stop 102 since the self-locking gearing 84 or 92, 94 counteracts a pivoting movement in the direction of arrow 106 out of the operative position A and does not allow this.

To secure the ball neck 14A in the operative position A without the presence of a self-locking gearing or for additional safety with the presence of a self-locking gearing, a locking device 110 is provided which has, for example, a locking pawl 114 which is mounted for pivoting about an axis 112, in its position locking the ball neck 14A in operative position A, illustrated in FIG. 5 with solid lines, engages behind the projection 100 of a side 116 located opposite the stop 102 and fixes it in position with a locking surface 118 against any movement in pivoting-out direction 106 so that the projection 100 is secured against any pivoting between the locking surface 118 and the stop 102.

In order to hold the locking pawl 114 in its locking position, a spring 120 is, for example, provided which acts on the locking pawl 114 in the direction of its locking position and is supported, for example, on the bearing member 24.

In order to enable the projection 100 to pivot into the position between the stop 102 and the locking surface 118 during movement of the bearing element 20 in pivoting-in direction 104, the locking pawl 114 is provided, in addition, with an inclined run-in surface 122 which extends at an acute angle in relation to the locking surface 118 and faces the projection 100 approaching in pivoting-in direction 104 so that the projection 100 moving in pivoting-in direction 104 and acting on the inclined run-in surface 122 moves the locking pawl 114 out of its locking position contrary to the action of the spring 120 and thus has the possibility of moving beyond the inclined surface 122 into its operative position A, in which it abuts on the stop 102. In this operative position A of the projection 100, the locking pawl 114 again moves in the direction of its locking position, wherein the locking surface 118 engages behind the side 116 of the projection 100 and fixes this in position.

In order to be able to move the projection 100 out of its position locked in operative position A, an actuation of the locking pawl 114 is required which moves this into its unlocking position indicated in FIG. 5 by dash-dot lines. In the simplest case, the actuation of the locking pawl 114 is carried out manually.

This actuation of the locking pawl 114 takes place, when a motor drive 80, 80' is present, preferably via a cam 124 movable by the drive 80 or 80', wherein the cam 124 results, for example, by way of a frictionally driven element which, when the drive starts to run, drives the cam 124 ahead of the bearing element 20 so that the locking pawl 114 is already in its unlocked position indicated in FIG. 5 by dash-dot lines before the projection 100 moves away from the stop 102 in pivoting-out direction 106. Such a leading of the drive of the cam 124 can be realized, for example, due to clearance between the element driven by friction and moving the cam 124 and the drive of the bearing element 20, for example via the bevel gear 90 or the gear wheel 94.

Figure 6:
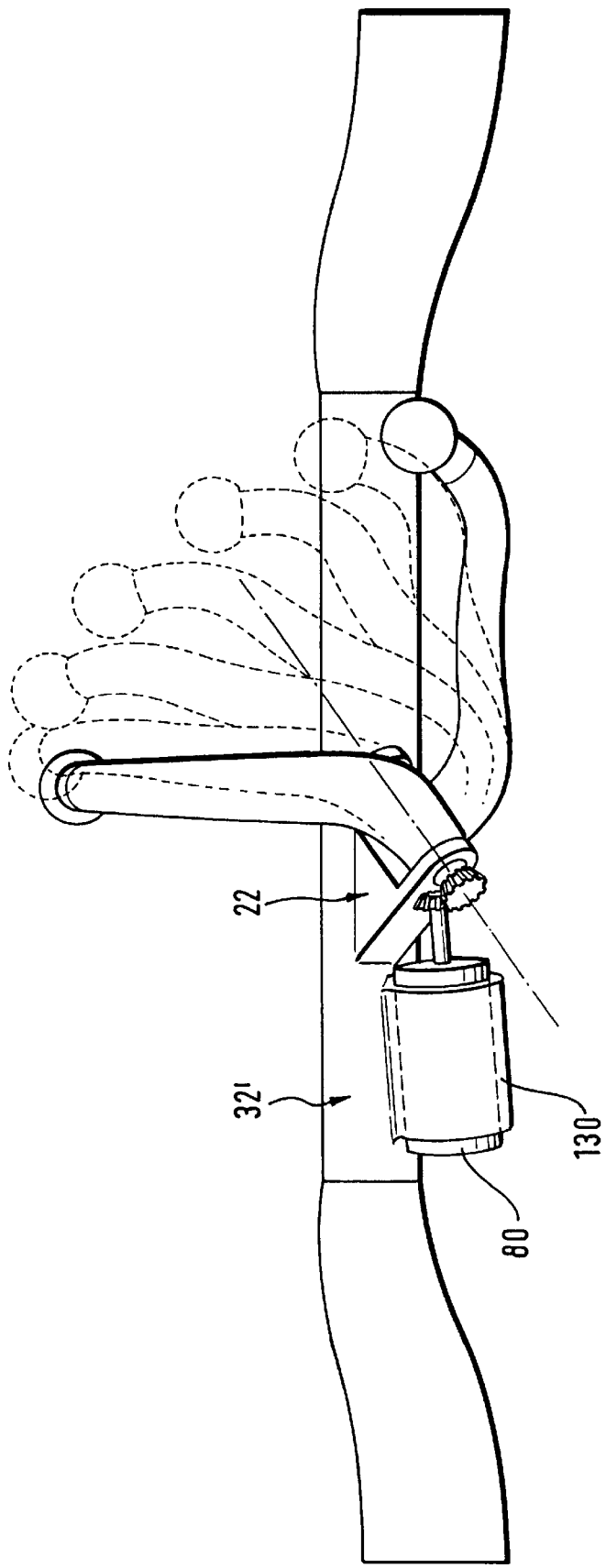
FIG. 6 shows a plan view similar to FIG. 3 of a second variation of an inventive trailer coupling.

In a preferred variation of an inventive solution, the transverse support member 32' is, as illustrated in FIG. 6, designed as a shaped part, for example as a casting, on which not only the entire pivot bearing 22 with all details but also a receiving means 130 for the drive 80 as well as a receiving means for the locking device 110 are integrally formed in one piece so that an assembly of the entire drive 80 is possible in a simple manner.

With this variation, the transverse support member 32' is, as illustrated, for example, in FIG. 7, provided in the region of its two ends 46 and 48 with mounting flanges 132 and 134, wherein each of the mounting flanges 132, 134, as illustrated in FIG. 8, has a passage 136, into which the respective side support 40, 42 positively engages with a pin 138, but so as to be rotatable about an axis 140.

If the two pins 138 of the two side supports 40, 42 are arranged coaxial to one another, the transverse support member 32' is, altogether, pivotable relative to the side supports 40 and 42 about the axis 140 which extends transversely to the longitudinal direction 34 of the vehicle but is, for the rest, rigidly connected to the side supports 40 and 42 so that the tensile loads can essentially be transferred through the pins 138 to the mounting flanges 132, 134. The non-rotatable fixing of the mounting flanges 132 in position on the side supports 40 and 42 may be brought about via any type of additional connection, such as, for example, an additional screwing through or welding or riveting.

In a further variation of the inventive solution, illustrated in FIG. 9, the transverse support member 32" likewise designed as a shaped part is provided in the region of its ends 46, 48 with extensions 142 which have cylindrical outer surfaces and engage in inner cylindrical receiving means 144 of the side supports 40' and 42'. This means that the transverse support member 32" can likewise be tilted about the axis 140 but is, for the rest, positively connected to it.

An additional, non-rotatable fixing of the transverse support member 32" in position on the side supports 40', 42' is likewise brought about either via screws, welds or rivets.

With the solutions according to FIGS. 7 and 8 or FIG. 9, which both allow a possible mounting of the transverse support member 32' or 32" relative to the side supports 40, 42 or 40', 42' in various tilt positions, it is possible to produce one single transverse support member 32' or 32" for a large number of vehicle types and to adapt this to the respective vehicle type—when required—via the shape of the side supports 40, 42 or 40', 42' and at the same time to vary an adaptation to the respective type of vehicle by way of a rotation of the transverse support member 32 or 32' in relation to the respective side supports 40, 42 or 40', 42' as a result of mounting in different positions tilted about the axis 140.

In all the embodiments, the transverse support member 32 or 32' or 32" bears the drive 80 or 80' where present and via the pivot bearing 22 the ball neck 14 with the coupling ball 12 not only in operative position but also in rest position and preferably extends in the transverse direction 44 of the vehicle to such an extent that the drive 80 or 80' as well as the ball neck 14R and the coupling ball 12R are located in the rest position R within the ends 46 and 48.

Thus, all the elements required for the functioning of the inventive pivotability of the ball neck 14 are arranged on the transverse support member 32 or 32' or 32" and no functionally relevant elements are provided in the side supports 40, 42 or 40', 42' at all so that these side supports 40, 42 or 40', 42' have to be varied merely to adapt them to the respective type of vehicle.

Figure 10:
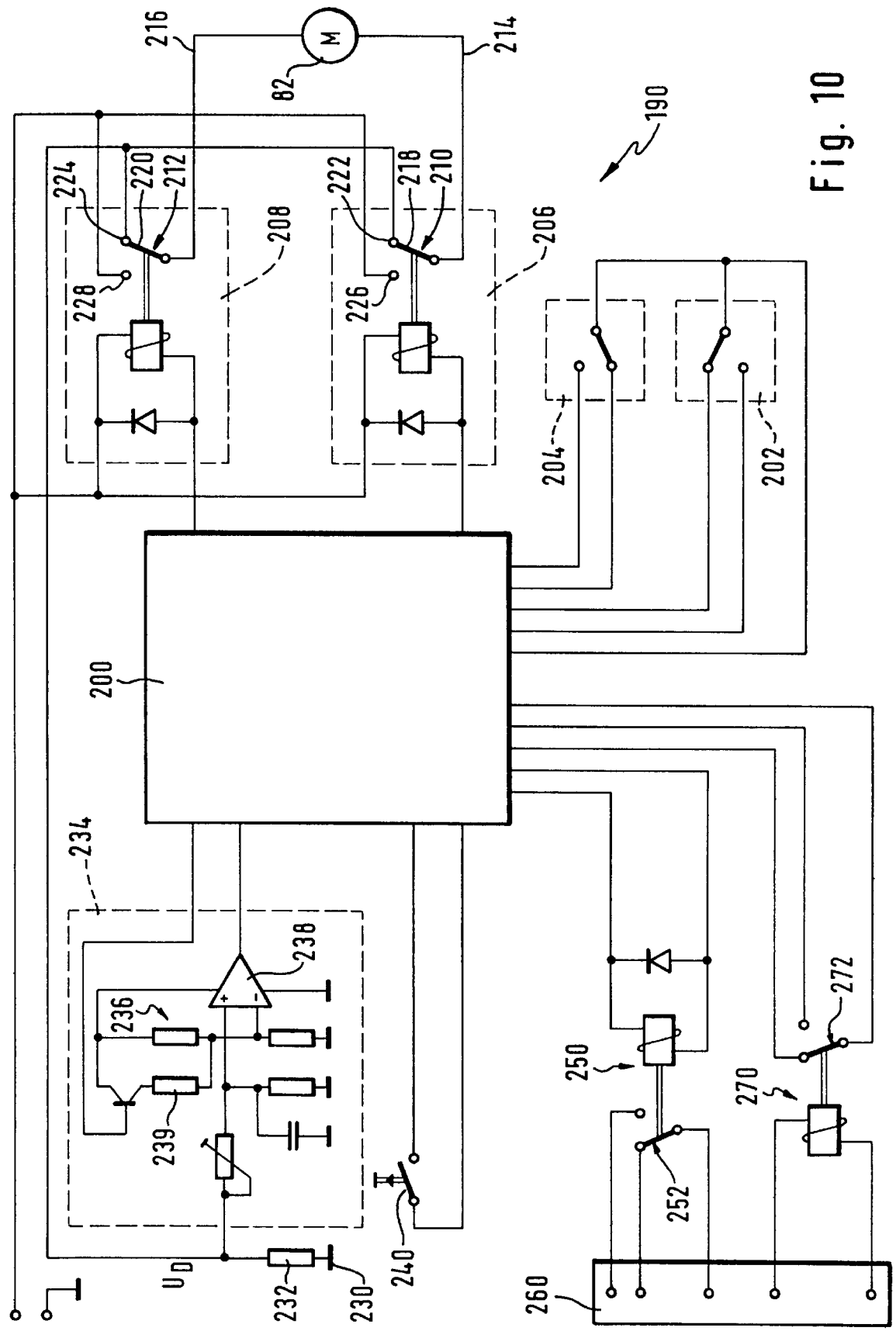
FIG. 10 shows a schematic illustration of an inventive control means.

To operate the inventive solution, a control means 190 is provided, which is illustrated in FIG. 10 and comprises as central element a control logic 200. This control logic 200 is realized, for example, by way of a processor or a fixed-program logic circuit.

A sensor 202, for example in the form of a limit switch, is connected to the control logic 200 and this sensor detects the operative position A of the ball neck 14 and the coupling ball 12.

For example, it is possible to arrange the limit switch such that it is actuated when the bearing element 20 has reached the operative position A. It would be possible, in particular, to actuate the limit switch 202 via the projection 100.

It is, however, even more advantageous when the limit switch 202 detects not only the operative position A of the bearing element 20 but also detects whether the locking device 110 locks the bearing element 20 in the operative position A in addition. This may be realized when the presence of the bearing element 20 in the operative position and the locking position of the locking device 110, i.e. in this case the locking pawl 114, are linked such that they actuate the limit switch 202 only when both conditions are met.

Alternatively thereto, it is conceivable to provide two sensors 202, wherein one of the sensors 202 detects the presence of the bearing element 20 in the operative position A and the other the locking position of the locking device 110, in particular the locking pawl 114.

Furthermore, the control logic 200 is connected to a second sensor 204 which serves to detect when the ball neck 14 and the coupling ball 12 have reached the rest position R. This sensor 204 can also be designed, for example, as a limit switch and actuated when the ball neck 14R is in the rest position, for example, directly by it.

In addition, the control logic 200 controls a first motor relay 206 and a second motor relay 208 which have changeover contacts 210 and 212, respectively, wherein the changeover contacts 210 and 212 each have a contact reed 218 and 220, respectively, connected to connection lines 214 and 216 of the electromotor 82. In the rest position, the contact reed 218 or 220 contacts a respective ground contact 222 or 224 and in the switching position a contact which is connected to a supply voltage 226 or 228. The electromotor 82 is operated either clockwise or anticlockwise depending on which of the switching relays 206 or 208 is activated by the control logic 200.

A resistor 232 located in front of the ground connection 230 is provided in the ground line connected to the ground contacts 222 and 224 of the switching relays 206 and 208, respectively, and a voltage UD proportional to the current flowing through the motor 82 decreases at this resistor. This voltage UD represents a measurement for the countertorque acting on the motor 82 on account of the dependency of the current flowing through the motor 82 on its countertorque. The voltage UD is detected at an input to an operational amplifier 238 via a torque detection circuit 234 operating as a threshold circuit and when it exceeds a threshold value specified to this threshold circuit, the operational amplifier 238 of the torque detection circuit 234 passes a signal to the control logic 200.

Preferably, different threshold values can be specified to the torque detection circuit 234 via the control logic 200. Should the ball neck 14 move out of the operative position or the rest position, for example, the control logic 200 specifies a higher threshold value to the threshold detection circuit 234 by connecting a resistor 239 in parallel at the voltage divider 236 in order to have a high break-away torque of the electromotor 82 available when the ball neck 14 moves out of the operative position A or the rest position R. This higher threshold value may be initiated by the sensors 202 or 204. Once the ball neck 14 has left the operative position A or the rest position R, detected by the sensors 202 or 204, the threshold detection circuit 234 operates with a reduced threshold value so that a countertorque which is lower in relation to the break-away torque is sufficient to pass a signal to the control logic 200 by means of the torque detection circuit 234.

If the control logic 200 receives a signal by way of the torque detection circuit 234, this leads to the control logic 200 immediately interrupting the activation of the electromotor 82 and inverting the direction of rotation. This means that the switching relays 206 and 208 are activated in the opposite direction to that prior to receipt of the signal from the torque detection circuit 234.

In addition, the inventive control means 190 is provided with a start switch 240, for example in the form of a key, connected to the control logic 200. If the start switch 240 is actuated when the ball neck 14 with the coupling ball 12 is either in operative position A or rest position R, the control logic 200 actuates the switching relays 206 and 208 in such a manner that the motor 82 starts up with the direction of rotation which is necessary to pivot the ball neck 14 with the coupling ball 12 into the respectively other position. This means that when the coupling neck 14 is in operative position A, the electromotor 82 starts up such that a pivoting thereof in the direction of the rest position R takes place whereas, when the ball neck 14 is in rest position R, the motor 82 will start up such that a pivoting thereof in the direction of the operative position A takes place.

Already after the start switch 214 has been actuated once, the electromotor 82 will run for such a time until the respective end position, i.e. the rest position or the operative position, is reached and notified by the sensors 202 or 204 to the control logic which then switches off the electromotor 82.

In addition, the start switch 240 serves at the same time as an emergency switch as an actuation of the start switch 240 in a position of the ball neck 14 which does not correspond either to the operative position A or to the rest position R causes the control logic 200 to reverse the running direction of the motor 82, i.e. the switching relays 206 and 208 are activated in the reverse direction so that the ball neck 14 is moved in the direction of the end position, from which it was moved prior to actuation of the start switch 240 as emergency switch.

Furthermore, the control logic 200 is connected to a pilot relay 250. This pilot relay 250 controls contacts 252 connected to an engine control 260 of the motor vehicle 36, wherein, for example, the engine control 260 makes it possible for the engine of the motor vehicle 36 to run when the contacts 252 are in a first position whereas in a second position of the contacts 252 of the pilot relay 250 and thus an activated pilot relay 250 the engine control 260 no longer allows the engine of the motor vehicle 36 to run. The control logic 200 always actuates the pilot relay 250 when the electromotor 82 is activated for pivoting the coupling neck 14 and so it is ensured that a pivoting of the coupling neck 14 between the operative position A and the rest position R cannot take place when the motor vehicle 36 is being driven.

In addition, the engine control 260 activates a pilot relay 270, the contacts 272 of which are connected to the control logic 200, wherein, for example, when the engine of the motor vehicle 36 is not running the contacts 272 are in a first position which conveys to the control logic 200 the information that a pivoting of the ball neck 14 is possible whereas when the engine of the motor vehicle 36 is running the contacts 272 are in a second position and thus convey to the control logic 200 the information that an actuation of the start switch 240 should remain out of consideration and the electromotor 82 may not start up.

What is claimed is:

1. A trailer coupling for a motor vehicle, comprising:
   a coupling ball;
   a ball neck, one end region thereof being angled and bearing the coupling ball, and the other end region thereof being connected to a bearing element; and
   a pivot bearing adapted to be mounted stationary with respect to the vehicle and pivotally mounting the bearing element; wherein:

said pivot bearing has a pivot axis that is adapted to be aligned at an angle to a vertical longitudinal plane parallel to the longitudinal direction of the vehicle;

said ball neck is pivotable with the coupling ball about the pivot axis from an operative position, in which the ball neck is adapted to extend essentially in the vertical longitudinal plane, into a rest position, in which the ball neck is adapted to extend approximately transversely to the vertical longitudinal plane, and vice versa;

a projection of a central axis of the coupling ball onto the vertical longitudinal plane undergoes a rotation of at least 80° during pivoting of the ball neck about the pivot axis from the operative position into the rest position; and a lowest point of the ball neck or the coupling ball in the rest position is at least the level above a road surface of a lowest point of the ball neck in the operative position.

2. A trailer coupling as defined in claim 1, wherein:

the projection of the coupling ball central axis onto the vertical longitudinal plane undergoes a rotation through more than 120°.

3. A trailer coupling as defined in claim 1, wherein:

the coupling ball in the rest position is arranged at a distance from a road surface equal to or smaller than a distance of the angled end region from the road surface.

4. A trailer coupling as defined in claim 1, wherein:

the ball neck and the coupling ball in the rest position are located on a side remote from a road surface of a horizontal plane defined by a lower edge of the pivot bearing.

5. A trailer coupling as defined in claim 1, wherein:

the projection of the pivot axis onto said vertical longitudinal plane parallel to the longitudinal direction of the vehicle is inclined at an angle ($\beta$) in relation to the horizontal, said angle being in an angular range of approximately 0° to approximately 60°.

6. A trailer coupling as defined in claim 5, wherein:

the angular range is up to approximately 50° at the most.

7. A trailer coupling as defined in claim 5, wherein: the angular range begins at at least approximately 15°.

8. A trailer coupling as defined in claim 1, wherein:

the projection of the pivot axis onto a horizontal plane extends through an angle ($\alpha$) inclined to the longitudinal direction of the vehicle, said angle being in an angular range of approximately 20° to approximately 70°.

9. A trailer coupling as defined in claim 8, wherein:

the angular range is between approximately 30° and approximately 65°.

10. A trailer coupling as defined in claim 1, wherein:

the projection of the pivot axis onto a vertical transverse plane extending at right angles to the longitudinal direction of the vehicle is inclined at an angle ($\gamma$) in relation to the horizontal, said angle being in an angular range of approximately 0° to approximately 60°.

11. A trailer coupling as defined in claim 1, wherein:

the angled end region of the ball neck in the rest position is located on a side remote from a road surface of a horizontal plane extending at the level of a lowest point of the coupling ball located in rest position; and the horizontal plane is located at least at the level of a lowest point of the ball neck located in operative position.

12. A trailer coupling as defined in claim 11, wherein:

the entire ball neck is located in the rest position on a side remote from the road surface of the horizontal plane extending at the level of the lowest point of the coupling ball located in rest position.

13. A trailer coupling as defined in claim 1, wherein:

the ball neck with the coupling ball is pivotable manually about the pivot axis.

14. A trailer coupling as defined in claim 1, wherein:

a drive having a motor is provided for carrying out the pivoting movement about the pivot axis.

15. A trailer coupling as defined in claim 1, wherein:

a drive acts on the bearing element via a self-locking gearing for carrying out the pivoting movement about the pivot axis.

16. A trailer coupling as defined in claim 1, wherein:

the pivoting movement of the ball neck about the pivot axis is limited by a stop that is stationary with respect to the vehicle.

17. A trailer coupling as defined in claim 16, wherein:

the bearing element has a projection acting on the stop stationary with respect to the vehicle in the rest position or the stop position.

18. A trailer coupling as defined in claim 1, wherein:

the ball neck is adapted to be fixed in the operative position by a locking device.

19. A trailer coupling as defined in claim 18, wherein:

the locking device is designed such that it transfers automatically into a locking position when the operative position of the ball neck is reached, and fixes the ball neck in the operative position.

20. A trailer coupling as defined in claim 19, wherein:

the locking device is adapted to be actuated via a release device for releasing the locking position.

21. A trailer coupling as defined in claim 1, wherein:

the pivot bearing is held on a transverse support member extending transversely to the longitudinal direction of the vehicle approximately in the same orientation as the rear fender.

22. A trailer coupling as defined in claim 21, wherein:

the transverse support member is arranged between, and connected to, two side supports.

23. A trailer coupling as defined in claim 22, wherein:

the transverse support member is adapted to be connected to the side supports via a connection adapted to be fixed in various rotary positions in relation to a transverse axis extending transversely to the longitudinal direction of the vehicle.

24. A trailer coupling as defined in claim 23, wherein:

the connection between the transverse support member and the side supports has two connecting elements engaging in one another and rotatable in opposite directions to one another only about the transverse axis.

25. A trailer coupling as defined in claim 21, wherein:

the ball neck in the rest position extends at least in sections along the transverse support member.

26. A trailer coupling as defined in claim 25, wherein:

the ball neck in the rest position extends at an approximately constant distance from a side of the transverse support member facing said ball neck.

27. A trailer coupling as defined in claim 25, wherein:

the ball neck with the coupling ball is located in the rest position such that a connecting line between the bearing element and the coupling ball extends approximately in the same direction as the transverse support member.

28. A trailer coupling as defined in claim 24, wherein:
the ball neck and the coupling ball are located in the rest position between the ends of the transverse support member.
29. A trailer coupling as defined in claim 21, wherein:
a drive for the pivoting of the ball neck is held on the transverse support member.
30. A trailer coupling as defined in claim 21, wherein:
stops for limiting the pivoting movement of the ball neck in the operative position and the rest position are held on the transverse support member.
31. A trailer coupling as defined in claim 21, wherein:
a locking device is arranged on the transverse support member.
32. A trailer coupling as defined in claim 21, wherein:
a drive for the pivoting movement is arranged on a side of the pivot bearing located opposite the rest position of ball neck and coupling ball.
33. A trailer coupling as defined in claim 21, wherein:
the transverse support member is a shaped part with the pivot bearing integrally formed thereon.
34. A trailer coupling as defined in claim 21, wherein:
the transverse support member is a shaped part and has a receiving means for a drive.
35. A trailer coupling as defined in claim 21, wherein:
the transverse support member is a shaped part with a stop integrally formed thereon.
36. A trailer coupling as defined in claim 21, wherein:
the transverse support member is a shaped part having a receiving means for a locking device.
37. A trailer coupling as defined in claim 1, wherein:
for activating a drive with a motor for the pivoting of ball neck and coupling ball between the operative position and the rest position, a control means is provided for operating the motor; and
the control means allows either a pivoting of the ball neck or traveling of the vehicle.
38. A trailer coupling as defined in claim 37, wherein:
the control means blocks the drive for the pivoting of the ball neck when an engine of the vehicle is running.
39. A trailer coupling as defined in claim 37, wherein:
the control means is adapted to allow an engine of the vehicle to run only when the ball neck is in the operative position or in the rest position.
40. A trailer coupling as defined in claim 37, wherein:
the control means detects the operative position and the rest position of the ball neck via a sensor respectively associated with these positions.
41. A trailer coupling as defined in claim 40, wherein:
the control means detects the operative position of the ball neck via a sensor detecting the locking position of the locking device.
42. A trailer coupling as defined in claim 37, wherein:
the control means supplies the motor with current following a single actuation of a switching element for such a time until the ball neck has reached either the operative position or the rest position.
43. A trailer coupling as defined in claim 37, wherein:
following an actuation of the switching element during the course of the pivoting movement of the ball neck between the operative position and the rest position the control means reverses the pivoting direction existing up to this actuation.
44. A trailer coupling as defined in claim 37, wherein:
the control means comprises a torque detection for the drive, said torque detection detecting any overrunning of a torque threshold of the drive.
45. A trailer coupling as defined in claim 44, wherein:
the torque detection generates a signal when the torque threshold is exceeded, said signal causing the control means to reverse the previous pivoting direction.
46. A trailer coupling as defined in claim 44, wherein:
the torque threshold in the operative position and the rest position is higher prior to leaving the same than thereafter.
47. A trailer coupling as defined in claim 44, wherein:
the torque detection detects the current consumption of the motor.
48. A trailer coupling for a motor vehicle, comprising:
a coupling ball;
a ball neck, one end region thereof being angled and bearing the coupling ball, and the other end region thereof being connected to a bearing element; and
a pivot bearing adapted to be mounted stationary with respect to the vehicle and pivotally mounting the bearing element; wherein:
said pivot bearing has a pivot axis that is adapted to be aligned at an angle to a vertical longitudinal plane parallel to the longitudinal direction of the vehicle;
said ball neck is pivotable with the coupling ball about the pivot axis from an operative position, in which the ball neck is adapted to extend essentially in the vertical longitudinal plane, into a rest position, in which the ball neck is adapted to extend approximately transversely to the vertical longitudinal plane, and vice versa;
the coupling ball in the rest position is arranged at a distance from a road surface equal to or smaller than a distance of the angled end region from the road surface; and
a lowest point of the ball neck or coupling ball in the rest position is at least at the level above a road surface of a lowest point of the ball neck in the operative position.
49. A trailer coupling for a motor vehicle, comprising:
a coupling ball;
a ball neck, one end region thereof being angled and bearing the coupling ball, and the other end region thereof being connected to a bearing element; and
a pivot bearing adapted to be mounted stationary with respect to the vehicle and pivotally mounting the bearing element; wherein:
said pivot bearing has a pivot axis that is adapted to be aligned at an angle to a vertical longitudinal plane parallel to the longitudinal direction of the vehicle;
said ball neck is pivotable with the coupling ball about the pivot axis from an operative position, in which the ball neck is adapted to extend essentially in the vertical longitudinal plane, into a rest position, in which the ball neck is adapted to extend approximately transversely to the vertical longitudinal plane, and vice versa; and
the ball neck and the coupling ball in the rest position are located on a side remote from a road surface of a horizontal plane defined by a lower edge of the pivot bearing.
50. A trailer coupling for a motor vehicle, comprising:
a coupling ball;
a ball neck, one end region thereof being angled and bearing the coupling ball, and the other end region thereof being connected to a bearing element; and a pivot bearing adapted to be mounted stationary with respect to the vehicle and pivotally mounting the bearing element; wherein:

said pivot bearing has a pivot axis that is adapted to be aligned at an angle to a vertical longitudinal plane parallel to the longitudinal direction of the vehicle;

said ball neck is pivotable with the coupling ball about the pivot axis from an operative position, in which the ball neck is adapted to extend essentially in the vertical longitudinal plane, into a rest position, in which the ball neck is adapted to extend approximately transversely to the vertical longitudinal plane, and vice versa;

the projection of the pivot axis onto said vertical longitudinal plane parallel to the longitudinal direction of the vehicle is inclined at an angle (β) in relation to the horizontal, said angle being in an angular range of approximately 0° to approximately 60°; and a lowest point of the ball neck and the coupling ball in the rest position is at least the level above a road surface of a lowest point of the ball neck in the operative position.

51. A trailer coupling as defined in claim 50, wherein:

the angular range is up to approximately 50° at the most.

52. A trailer coupling as defined in claim 50, wherein:

the angular range begins at at least approximately 15°.

* * * * *